April 1, 1941.  D. W. GUSTAVESON  2,237,000
HINGE CONSTRUCTION FOR COOKING DEVICES
Filed March 10, 1939
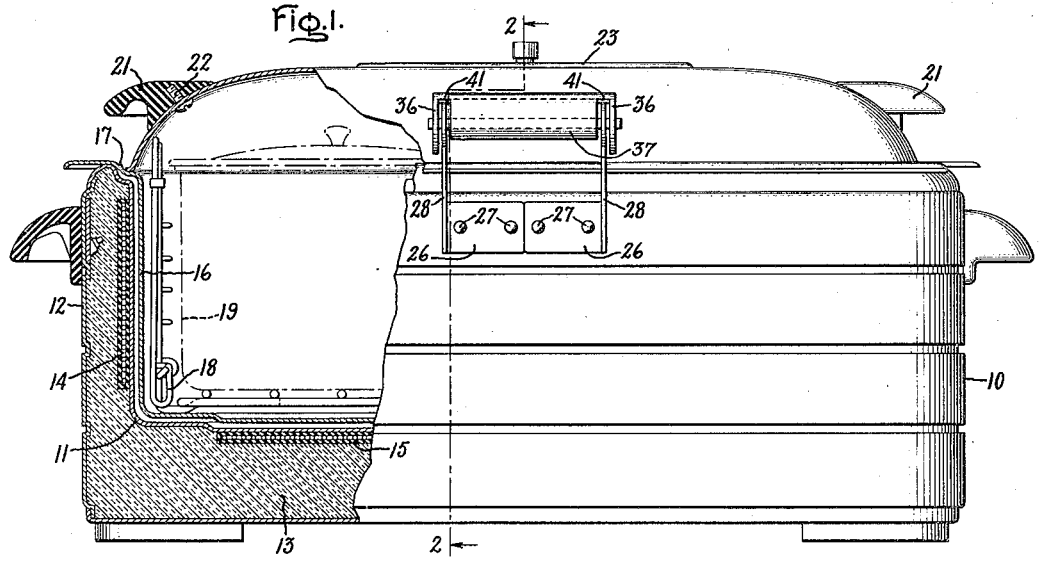
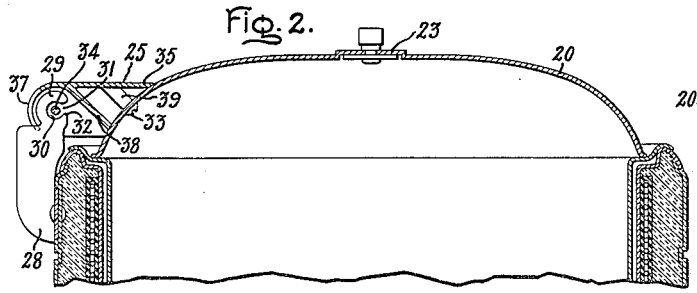
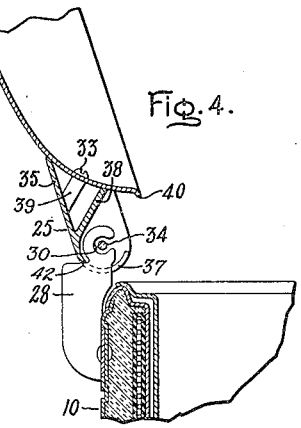
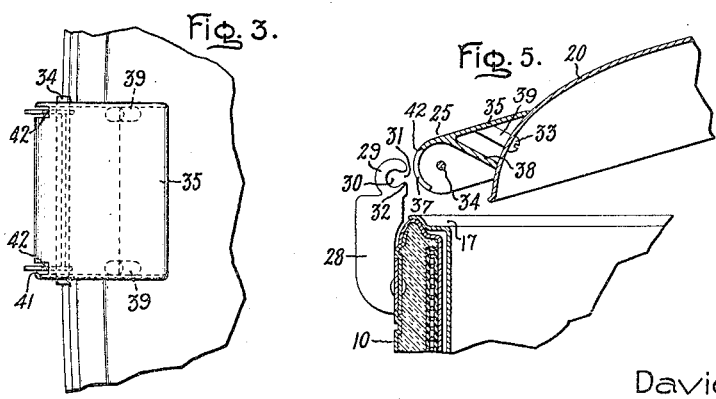
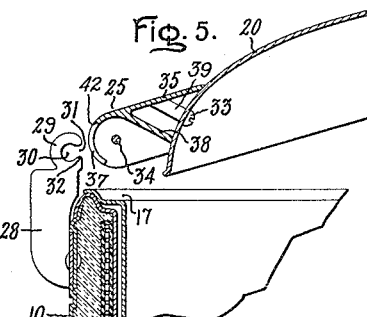
Inventor:
David W. Gustaveson,
by Harry E. Dunham
His Attorney.

Patented Apr. 1, 1941

2,237,000

UNITED STATES PATENT OFFICE 2,237,000

HINGE CONSTRUCTION FOR COOKING DEVICES

David W. Gustaveson, Bridgeport, Conn., assignor to General Electric Company, a corporation of New York Application March 10, 1939, Serial No. 261,009

9 Claims. (Cl. 16—174)

My invention relates to electric cooking devices and more particularly to electric roasters.

In electric roaster constructions it is customary to provide the roaster with a removable cover. In heating devices of this character, it is desirable that the cover be securely hinged so that it is unlikely to become detached as it is being opened and shut. However, it is also desirable that the cover may be readily removed so that it may be cleaned and so that unrestricted access may be had to the cooking well at certain times, for example, during the loading and unloading of the well.

In one of its aspects my invention contemplates the provision of a hinge construction for an electric roaster which permits the cover to be hingedly and removably mounted on the roaster frame.

In its more specific aspects my invention contemplates the provision of a hinge construction which permits the removal of the cover of an electric roaster when the cover is substantially in its closed position and which forms a positive interlocking hinge arrangement when the roaster cover is in all other positions.

In another aspect my invention contemplates the provision of a hinge construction which may be readily separated when the component parts thereof are in the position corresponding to the closed or substantially closed position of the hinged unit, and which is provided with means for interlocking the component parts of the hinge when they are rotated a small distance from said separable position, and for maintaining the interlocking relation between the parts in all other positions of the hinge unit.

In a further more specific aspect my invention contemplates so hinging the cover of an electric roaster to the roaster well that condensate which has collected in the cover will drain into the roaster well when the cover is in its open hinged position.

Further, more specific aspects and advantages of my invention will become apparent as the following description proceeds and the features of novelty which characterize my invention will be set forth with particularity in the claims annexed to and forming a part of this specification.

For a fuller understanding of my invention reference should be made to the accompanying drawing in which Fig. 1 is a rear elevation of an electric roaster showing the hinge construction of my invention; Fig. 2 is a partial sectional view taken on the line 2—2 of Fig. 1; Fig. 3 is a plan view of the hinge structure shown in Fig. 1; Fig. 4 is a partial sectional view showing the relationship of the hinge members when the cover is in the hinged open position; and Fig. 5 is a partial sectional view showing the relationship of the component elements of the hinge when the cover is being removed from or placed on the roaster.

Referring to Fig. 1 it will be observed that I have applied my improved hinge construction to an electric roaster having a well defining portion 10 comprising an inner wall 11 and an outer wall 12 between which is arranged a suitable insulating material 13, such as rock wool. Embedded in the rock wool and wrapped around the vertical portion of the inner wall 11 is a suitable heating unit 14 and embedded in the rock wool and arranged adjacent the bottom of the inner wall 11 is another suitable heating element 15. Inserted in the well defined by the member 10 is a removable well 16 which is provided with a marginal flange 17 adjacent its upper edge. As illustrated in Fig. 1, a removable rack 18 is inserted in the removable well 16. The rack 18 is preferably of the type described and claimed in my copending application Serial No. 261,008, filed March 10, 1939, which issued as Patent 2,179,291 on November 7, 1939, and is assigned to the assignee of the present invention. The rack 18 is adapted to support suitable cooking utensils 19.

Arranged on the well defining member 10 and adapted to be supported in the marginal flange 17 is a cover 20 which is provided with a pair of suitable handles 21 attached thereto by means of screws 22. Mounted in the top of the cover member 20 is a suitable vent 23. This vent forms no part of my invention and may be of any desired type.

The cover member 20 is adapted to be removable from the member 10 when in its closed position or raised not more than fifteen or twenty degrees and is also adapted to be hingedly mounted on the member 10 when rotated through an angle greater than approximately twenty degrees. In accomplishing these ends I have provided a hinge construction comprising a pair of hinge brackets riveted or otherwise firmly secured to the outer wall 12 of the member 10 and a hinge plate firmly secured to the cover 20.

Each of the hinge brackets comprises a mounting plate 26 through which is adapted to extend the securing means such as rivets 27. In the preferred arrangement the mounting plates 26 are mounted in abutting relation as shown in Fig. 1. Integrally formed on each of the mounting plates 26 is a vertically extending arm or bracket 28. Provided on the upper end of each of these brackets 28 is a curved hook-like portion 29 which is constructed to define a recess or slot 30 having an opening 31 on the side adjacent the roaster well and cover. A boss 32 is provided in the curved hook-like member adjacent the opening 31. This boss 32 provides an obstruction in the opening 31 and prevents the pintle 34 from sliding out of engagement with the slot 30 when the cover is in its closed position and is raised by one of its side handles 21. It was found that if such bosses were not provided, the pintle 34 would slide out of the slot in the hinge bracket on the side opposite the handle raised.

Mounted on the cover 20 by means of some suitable fastening means, such as screws 33, is the hinge plate 25 which carries the pintle 34 arranged to cooperate with the recesses 30 in the brackets 28. The hinge plate 25 consists of a substantially rectangular shaped die casting which is provided with a top wall 35, a pair of side walls 36 and a curved end wall 37. The plate may be formed of any suitable material, such as aluminum. Extending between the side walls 36 and inclined to the top wall 35 is a reenforcing bracket 38. Also arranged adjacent the side walls 36 and inclined to the top wall 35 so as to be substantially parallel to bracket 38 is a pair of bosses 39 adapted to receive the screws 33. In the preferred embodiment, screws 33 are of the self-tapping type and are adapted to be screwed into openings provided in the bosses 39. It will be observed that the reenforcing bracket 38 and the bosses 39 are inclined at an angle so as to lie substantially normal to the curved surface of the cover at the point of attachment of the bracket to the cover. The hinge plate 25 is mounted and positioned on the cover 20 in such a manner that when the hinge plate and its associated pintle are in engagement with the hinge bracket, the rear edge 40 of the cover (Figs. 4 and 5) will overlie the roaster well.

As previously mentioned, the end wall 37 is substantially curved. Cut into the end wall 37 adjacent each of the side walls 36 are recesses 41 which are adapted to receive the hooklike ends 29 of the brackets 28 in the manner to be more fully described hereinafter.

In cutting the slots 41 in the curved end wall 37, the depth of the cut is such that the top edge 42 of the slot lies to the left of the pintle 34 as viewed in Figs. 2, 4 and 5. The location of the edge 42 of the slot 41 determines the distance through which the cover may be rotated or raised and still be removed from the roaster. In the arrangement just described, the edge 42 of the slot 41 is so located that the cover may be rotated through an angle of approximately fifteen to twenty degrees before it is positively hinged to the body portion 10. In other words, hinge plate 25 may be rotated through an angle of fifteen to twenty degrees before it is locked in hinged relation with members 28.

The assembly and operation of my improved hinge construction will be more clearly understood by referring to Figs. 2, 4 and 5. Referring to Fig. 5, it will be observed that the component parts of the hinge have been secured to the well defining portion 10 and the cover 20 and the parts are shown in their relative position just prior to the cover being placed in position on the body portion 10. From the position shown in Fig. 5, the cover is moved to the left until the end wall 37 is adjacent the brackets 28. The cover is then adjusted so that the slots 41 in end wall 37 are opposite the hook-like portions 29 on the upper ends of the brackets 28 whereupon the cover is further moved to the left until the pintle 34 engages the recesses 30 formed by the hook-like portions 29. When this has occurred, the component parts are in the relative position shown in Fig. 2 and are adapted to hinge the cover 20 to the well defining portion 10. It is to be observed that while the cover 20 is in the horizontal position or raised through an angle not greater than twenty degrees, it is readily removable from the portion 10.

With the cover in position and the component parts of the hinge in engagement as shown in Fig. 2, the cover is adapted to be rotated to the open position such as shown in Fig. 4. It is to be observed that when the cover is raised through an angle greater than approximately twenty degrees an interlocking connection is formed between the component parts of the hinge so that the cover can no longer be removed from the roaster unit. This interlocking connection is formed by means of the relationship between the hook-like portion 29 of the brackets 28 and the edge 42 of the slot 41. When the cover is moved to the open position, the edge 42 of the slot is rotated counterclockwise, and when the cover has been raised through an angle greater than twenty degrees, the edge 42 is moved sufficiently far in the counterclockwise direction that it will engage the outside edge of the hook-like portion 29 should the cover be moved to the right, as viewed in Figs. 2, 4 and 5, thereby limiting the lateral movement of the cover and preventing the removal of the pintle 34 from the recess 30.

As previously described, the hinge plate 25 is attached to the cover so that the rear edge 40 of the cover will overlie the upper edge of the roaster well when the cover is open, as shown in Fig. 4. It will be observed that by means of this arrangement any condensate which is collected in the cover will be drained into the roaster well when the cover is in the open position.

By means of this improved hinge construction it will be observed that the cover of the electric roaster is readily removable so as to permit unrestricted access to the roaster well for the loading and unloading thereof and for cleaning purposes, and at the same time permits a positive hinging of the cover so as to facilitate the movement thereof when it is desired to inspect the foods being prepared.

While I have shown a particular embodiment of my invention, it will be understood, of course, that I do not wish to be limited thereto since many modifications may be made, and I, therefore, intend in the appended claims to cover all modifications within the true spirit and scope of my invention.

What I claim as new and desire to secure by Letters Patent of the United States, is:

1. In a separable hinge construction, hinge brackets having a slot adjacent the upper ends thereof, a hinge plate, a pintle mounted on said hinge plate, an end wall on said hinge plate partially surrounding said pintle and having recesses therein through which said brackets may be inserted to engage said pintle when said members are in a narrow range of position, and means for interlocking said brackets and hinge plate when said members are in all other positions.

2. In a hinge structure for hinging a cover to a cooking utensil, a hinge bracket having a slot formed in the upper portion thereof, a hinge plate having an end wall provided with a recess therein, and a pintle in said hinge plate adjacent said end wall and adapted to be inserted in said slot formed in said bracket, said upper portion of said bracket having a height less than said recess in said end wall so that said upper portion of said bracket may be moved laterally through said recess when said cover is in a substantially horizontal position to cause said pintle to be inserted into or removed from said slot in said bracket to attach or disengage said cover, and means comprising a portion of said end wall which is adapted to engage said upper portion of said hinge bracket for locking said pintle in engagement with said slot to maintain said cover and utensil in hinged relation in all but said substantially horizontal position of said cover.

3. In an electric roaster having a cover, means for hinging said cover to said roaster, said hinge means comprising hinge brackets mounted on said roaster and each having a hook-like portion extending above the top thereof, a hinge plate mounted on said cover, a substantially curved end wall integrally formed on said hinge plate and having recesses therein, and a pintle mounted in said plate adjacent said curved end wall, said recesses in said end wall having a length greater than said hook-like portion of said bracket so as to permit said brackets to be moved through said recesses when said cover is in a substantially horizontal position so that said pintle may be inserted in or removed from said slots in said brackets and said cover thereby secured to or removed from said roaster.

4. A detachable hinge construction for a cover for a cooking utensil comprising a pair of hinge brackets having a slot adjacent the upper ends thereof, a hinge plate having a top wall, a pair of side walls, and an end wall provided with a pair of recesses, and a pintle mounted in said side walls, said pintle adapted to be inserted in said slots in said brackets when said brackets are inserted in said recesses in said end wall.

5. A detachable hinge construction for a cover for an electric roaster comprising a pair of hinge brackets adapted to be mounted on the side wall of the roaster and having hook-like portions adjacent the upper end thereof, each of said hook-like portions forming a slot in each of said brackets, a hinge plate adapted to be attached to said cover and having an end wall, a pintle mounted in said hinge plate adjacent said end wall, said end wall having recesses through which the hook-like upper ends of said brackets may be inserted so that said pintle may be inserted in or removed from said slots defined by said hook-like portions when said cover is inclined not more than substantially 20 degrees to the horizontal, and means comprising the top surface of said recesses in said end wall for cooperating with said hook-like portions to prevent said pintle from being removed from said slots in said hook-like portions when said cover is raised through an angle greater than substantially 20 degrees.

6. In a separable hinge construction for a container having a cover, hinge brackets adapted to be mounted on said container, a hook-like portion adjacent the upper end of said brackets and defining a slot in each bracket, a hinge plate adapted to be mounted on said cover and having an end wall, a pintle mounted in said hinge plate adjacent said end wall, said end wall having recesses cut therein through which said hook-like portions may be inserted so that said pintle may engage said slots formed by said hook-like portions, said recesses in said end wall having an upper edge which is spaced from said pintle in the direction of said end wall, said upper edge permitting the insertion of said pintle in said slots in said brackets when said cover is in a substantially horizontal position and cooperating with said hook-like portion of said brackets to prevent the removal of said pintle from said slots when said cover is raised.

7. A hinge plate for an electric roaster comprising a top wall, a pair of side walls, and a curved end wall having a pair of recesses cut therein, a pintle mounted in said side walls adjacent said end wall and extending transversely of the hinge plate, and a reenforcing bracket extending between said side walls and integrally formed with said side and top walls, said bracket adapted to lie normal to the surface to which the hinge plate is attached.

8. A hinge plate adapted to be attached to the cover of an electric roaster and comprising a unitary structure having a top wall, a pair of side walls, an end wall having a pair of recesses cut therein adjacent said side walls, a reenforcing bracket between said side walls and inclined to said top wall at an angle which permits it to lie substantially normal to the surface of the cover to which it is attached, and bosses formed on said side walls and adapted to receive self-tapping screws for mounting said hinge plate on said cover, said bosses extending substantially parallel to said bracket and lying between said bracket and the end of said top wall which engages said cover.

9. A hinge plate adapted to be attached to a surface to be hinged comprising a top wall, a pair of side walls, an end wall having a pair of recesses formed therein, a pintle mounted in said side walls adjacent said end wall and extending transversely of said hinge plate, and a boss integrally formed in said hinge plate adjacent each of said side walls so as to receive self-tapping screws for supporting said hinge plate on said surface, said bosses extending at an angle to said top wall so that they lie substantially normal to the surface to which said hinge plate is secured.

DAVID W. GUSTAVESON.